(12) United States Patent
Chrisman et al.

(10) Patent No.: US 10,371,888 B1
(45) Date of Patent: Aug. 6, 2019

(54) LOW-PROFILE DROP LIGHT FOR UNDER-VEHICLE USE

(71) Applicant: Uberlux, Inc., Carmel, IN (US)

(72) Inventors: Lars Chrisman, Gobles, MI (US);
Patrick Franz Haider, Vienna (AT);
Steven Luke Anthony Zimmermann, Carmel, IN (US)

(73) Assignee: UBERLUX, INC., Carmel, IN (US)

( * ) Notice: Subject to any disclaimer, the term of this patent is extended or adjusted under 35 U.S.C. 154(b) by 0 days.

(21) Appl. No.: 16/207,698

(22) Filed: Dec. 3, 2018

(51) Int. Cl.
| | |
|---|---|
| F21V 31/00 | (2006.01) |
| F21V 8/00 | (2006.01) |
| F21V 23/00 | (2015.01) |
| F21V 23/02 | (2006.01) |
| F21W 131/402 | (2006.01) |

(Continued)

(52) U.S. Cl.
CPC .......... *G02B 6/0093* (2013.01); *F21V 23/001* (2013.01); *F21V 23/02* (2013.01); *F21V 31/005* (2013.01); *G02B 6/0051* (2013.01); *G02B 6/0065* (2013.01); *G02B 6/0088* (2013.01); *G02B 6/0091* (2013.01); *F21S 6/002* (2013.01); *F21W 2131/402* (2013.01); *F21Y 2115/10* (2016.08)

(58) Field of Classification Search
CPC ..... F21S 6/004; G02B 6/0051; G02B 6/0065; G02B 6/0088; G02B 6/0093
See application file for complete search history.

(56) References Cited

U.S. PATENT DOCUMENTS

| 4,329,739 A | * | 5/1982 | Loebner | ............... F21S 8/032 |
| | | | | 362/153 |
| 4,697,950 A | | 10/1987 | Copeland | |

(Continued)

FOREIGN PATENT DOCUMENTS

| CN | 207455340 U | 6/2018 |
| EP | 3354815 A1 | 8/2018 |

(Continued)

OTHER PUBLICATIONS

Wurth, "LED Flashpad Step", downloaded from https://eshop.wuerth.at/LED-Flashpad-Step-LIGHT-LED-FLASHPAD-STEP/0981300000.sku/en/US/EUR/ on Aug. 30, 2018, 5 pages (pp. 1-5 in pdf).

*Primary Examiner* — Zheng Song
(74) *Attorney, Agent, or Firm* — Mitch Harris, Atty at Law, LLC; Andrew M. Harris

(57) ABSTRACT

A lighting device for under-vehicle use in service and inspection locations, provides improved chemical and mechanical resistance to damage. The lighting device includes a planar light guide that is installed within a cavity of a unitary rectangular bottom support that has beveled edges and rounded corners to prevent damage during rollover. The planar light guide is illuminated with one or more LED strips at side(s) of the light guide. A transparent or semi-transparent front cover is sealed over the LED strips and planar light guide with a rectangular seal that may have a circular cross section that partially lies within a channel formed in the bottom support. The light guide is backed with a reflector and one or more diffusers may be inserted between a top side of the light guide and the front cover, which is held in place with an inset frame that fastens to the bottom support.

18 Claims, 6 Drawing Sheets

(51) Int. Cl.
  *F21Y 115/10* (2016.01)
  *F21S 6/00* (2006.01)

(56) References Cited

U.S. PATENT DOCUMENTS

| | | | |
|---|---|---|---|
| 5,848,830 A * | 12/1998 | Castle | A47G 27/0243 |
| | | | 362/84 |
| D459,005 S | 6/2002 | Tagawa | |
| 6,615,526 B2 * | 9/2003 | Pitcher | G09F 1/12 |
| | | | 40/722 |
| 8,092,034 B2 | 1/2012 | Zarian et al. | |
| 8,206,002 B1 * | 6/2012 | Olson | B25H 5/00 |
| | | | 280/32.6 |
| 9,500,328 B2 | 11/2016 | Myers et al. | |
| 2008/0037284 A1 | 2/2008 | Rudisill | |
| 2009/0116241 A1 * | 5/2009 | Ashoff | F21V 33/006 |
| | | | 362/253 |
| 2010/0103695 A1 * | 4/2010 | Opitz | F21V 33/006 |
| | | | 362/554 |
| 2011/0310595 A1 * | 12/2011 | Hardesty | E04F 15/02166 |
| | | | 362/153 |
| 2014/0254158 A1 * | 9/2014 | Mangus | F21V 15/01 |
| | | | 362/249.05 |
| 2015/0103558 A1 * | 4/2015 | Fobbe | G02B 6/0081 |
| | | | 362/612 |
| 2016/0289962 A1 * | 10/2016 | Crow | G02B 6/0073 |
| 2016/0320048 A1 | 11/2016 | Daniels | |
| 2018/0153328 A1 * | 6/2018 | Girard | E04F 15/02161 |

FOREIGN PATENT DOCUMENTS

FR          2978526 B1    5/2018
WO    WO 2002095287 A1   11/2002

* cited by examiner

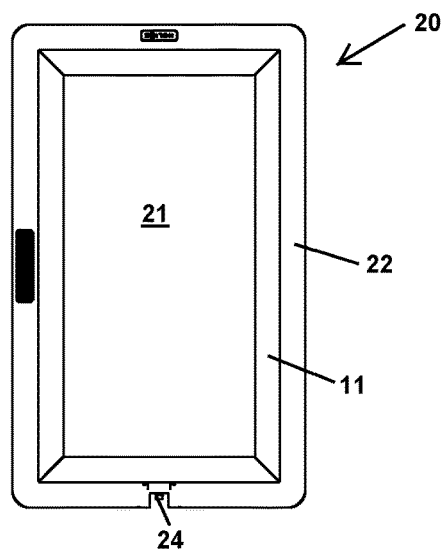
Fig. 2C
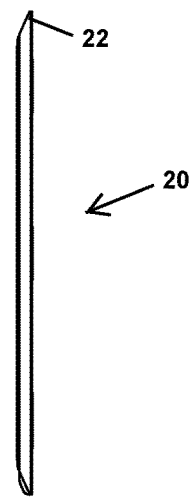
Fig. 2A
Fig. 2B
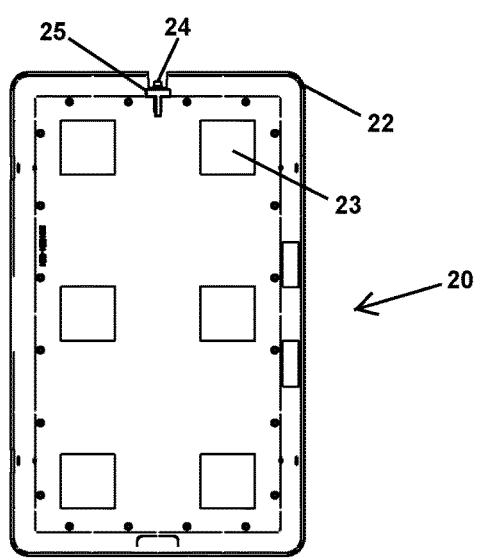
Fig. 2D

10,371,888 B1

LOW-PROFILE DROP LIGHT FOR UNDER-VEHICLE USE

BACKGROUND OF THE INVENTION

1. Field of the Invention

The present invention relates generally to lighting devices, and in particular, to a drop light for use in vehicle maintenance and inspection, along with similar applications.

2. Description of the Related Art

Lighting underneath vehicles for performing repair and maintenance or inspections is typically provided by hand-held lighting such as flashlights and spotlights or by portable floor or hook/magnet suspended drop lights that have ranged from incandescent lights suspended in a protective housing to more modern LED-based lights that provide more efficient and low-profile packaging.

However, existing lighting devices lack the environmental resistance to fluids and other materials that are present in vehicle maintenance and inspection sites, vehicle shop environments and open areas such as road or checkpoint inspection stations. Such lights further lack the strength to withstand damage due to roll-over of a cart, winch, vehicle, etc., or other events such as part drops that can impact the lighting device when it is positioned on a shop floor or on the ground in outside areas. Such lights, if resistant to intrusion of liquids or dirt are typically sealed and are not serviceable.

Therefore, it would be desirable to provide a lighting device having improved resistance to environmental mechanical and chemical damage, and is serviceable.

SUMMARY OF THE INVENTION

The above objectives, among others, are achieved in a lighting device, a lighting system, and a method of construction of the lighting device.

The lighting device includes light-emitting-diode (LED) lighting strips arranged on opposite edges of a planar light guide, a transparent or semi-transparent cover sheet disposed above a top side of the planar light guide and a unitary bottom support disposed beneath the planar light guide. The bottom support includes a central cavity that supports and encloses the LED lighting strips, the planar light guide and the cover sheet and includes beveled edges extending from above the cover sheet and to a back plane of the bottom support on both sides and both ends of the lighting device.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIG. 2A is top view, FIG. 2B is a side view, FIG. 2C is an end view and FIG. 2D is a rear view, respectively, of example lighting device 20 of FIG. 1.

DESCRIPTION OF ILLUSTRATIVE EMBODIMENT

The present disclosure illustrates a new lighting device, lighting system and method of construction of the lighting device. The lighting device is completely serviceable, as no adhesives or permanent seals are used in the construction, and can be disassembled by removal of mechanical fasteners, such as machine bolts. The structure and materials used to construct the lighting device provide tool and part drop-resistance and load-bearing in excess of 15 tons produced on a footprint equivalent to that of an 8" wide tire, without causing damage to the lighting device or breaking an anti-fluid-ingress seal of the lighting device.

Figure 1:
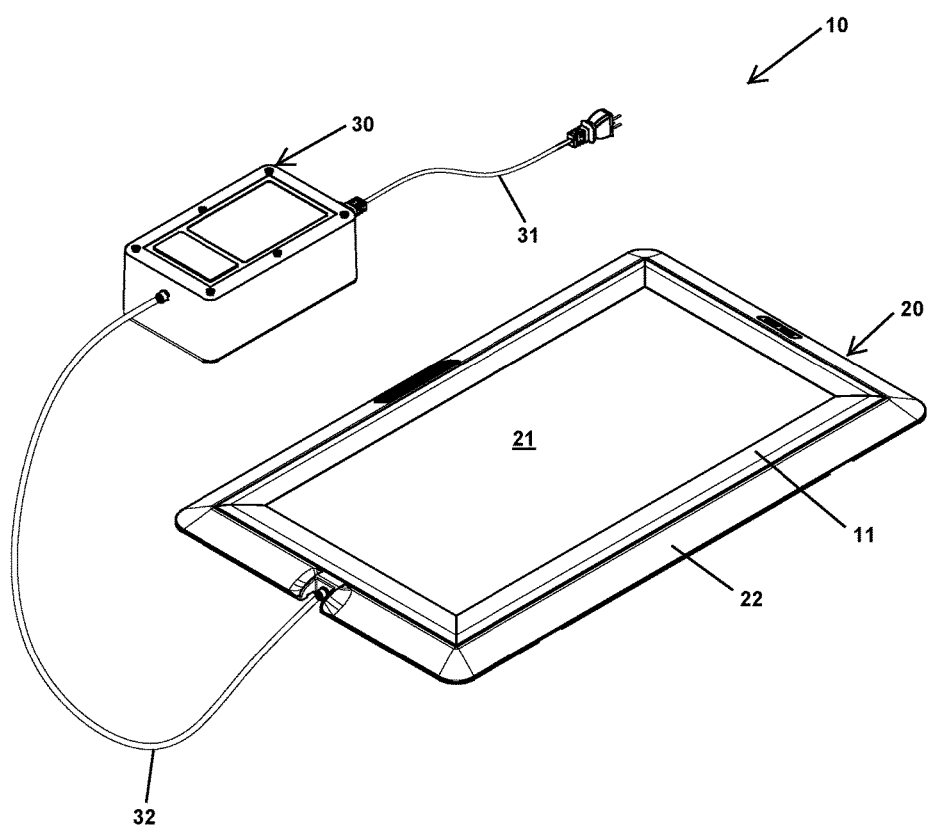
FIG. 1 is a perspective view of an example lighting system 10 according to the disclosure, including an example lighting device 20 and a power supply 30.

Referring now to FIG. 1, a perspective view of an example lighting system 10 for under-vehicle maintenance, service and inspection use is shown. Lighting system 10 includes a power supply 30 that supplies a source of DC voltage and current to a lighting device 20 via a cable 32. An AC mains cable 31 is used to supply input power to power supply 30. Lighting device 20 is framed with a bottom support 22 that supports lighting device 20 on a floor or other surface. An inset frame 11 is secured to bottom support 22 and retains a front cover 21 and other components of lighting device 20 within a rectangular cavity formed in the central portion of bottom support 22. While illustrated lighting device 20 is rectangular and therefore has a rectangular bottom support 22, as well as other components, it is understood that other shape such as polygonal or circular lighting devices may be implemented using the techniques and structures disclosed herein.

Referring now to FIGS. 2A-2D, further details of example lighting device 20 are shown in a front view, a side view, an end view and a rear view, respectively. Front view FIG. 2A illustrates the location of a DC input power connector 24 to which cable 32 of FIG. 1 connects, along with the relative size and relationship of inset frame 11, bottom support 22 and front cover 21. FIG. 2A also illustrates the top profile shape of bottom support 22, which has rounded corners that eliminate seams or peaks in the beveled (or rounded) edges of bottom support 22 that are visible in side view FIG. 2B and end view FIG. 2C. Such a profile eliminates or reduces damage due to roll-over events, and also reduces the chance of tripping or movement of lighting device 20 when kicked or stepped on by service personnel. Bottom view FIG. 2D illustrates further details of DC input power connector 24, which is held in place by a T-shaped plug 25 and the presence of a number of anti-skid pads 23 that are attached to locations on the bottom surface of bottom support 22 to prevent movement of lighting device 20 on a floor.

Figure 3:
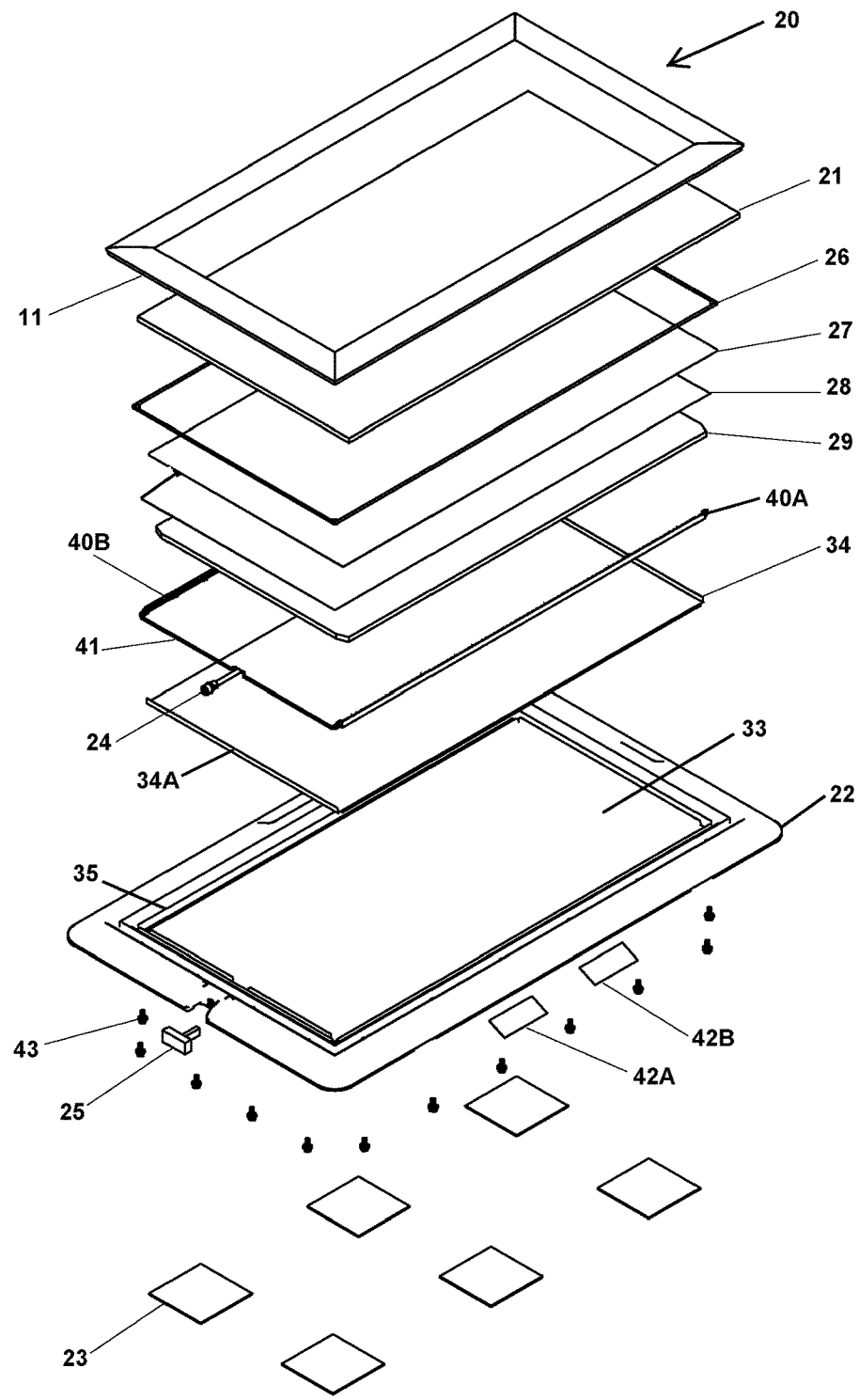
FIG. 3 is a perspective exploded view of example lighting device 20 of FIG. 1.

Referring now to FIG. 3, an exploded view of example lighting device 20 is shown. Inset frame 11 fastens to bottom support 22 with a plurality of machine bolts 43 and inset frame 11 includes threaded studs (not shown) on a bottom side thereof to receive machine bolts 43. Front cover 21, which is generally a transparent or semi-transparent sheet, is secured within a cavity 33 formed in bottom support 22 and secured by inset frame 11 over a stack-up of other optical components, including a double-sided diffuser sheet 27 that spreads illumination from a light guide 29 that receives light from a pair of light-emitting diode (LED) strips 40A and 40B that are electrically connected (in series or parallel) to DC input power connector 24 by wiring 41. A suitable double-sided diffuser sheet is the C-series High Performance diffuser manufactured by Brightview Technologies. A rectangular seal 26 in the form of a rectangular "O-ring", i.e., a rectangular seal with a circular cross-section formed from rubber or other flexible and fuel/oil-resistant material, is inserted between front cover 21 and a channel 35 formed in bottom support 22 that receives a portion of the cross-section of rectangular seal 26. T-shaped plug 25 fits within a recess (not shown) of bottom support 22, to secure DC input power connector 24 when lighting device 20 is assembled.

LED strips 40A and 40B are selected to provide the desired intensity and to have a sufficient number of LEDs each to reduce variation in intensity along the length of light guide 29. Diffuser sheet 27 further reduces variation in intensity of light emitted through front cover 21 from light guide 29 by diffusing light in the space between the top surface of light guide 29 and front cover 21. An additional diffuser sheet 28 is inserted between diffuser sheet 27 and light guide 29 to prevent glare from angles greater than approximately 60 degrees from the direction normal to front cover 21, i.e., directly upward when lighting device 20 is lying on a floor. A suitable anti-glare diffuser is the G-series diffuser by Brightview Technologies. Diffuser sheet 27 is selected to have an angular response that directs light primarily upward, causing an attenuation of light emitted from angles past 45 degrees from the normal direction perpendicular to front cover 21, i.e, upward, when lighting device 20 is placed on a floor. A reflector plate 34 is inserted underneath light guide 29 to increase optical efficiency. Alternatively, the bottom of cavity 33 in bottom support 22 may be polished. However, reflector plate 34 can be more readily compressed to contact light guide 29 to increase optical efficiency and has bent edges 34A that align reflector plate 34 with light guide 29 and reduce the escape of light from the ends of light guide 29. A pair of labels 42A and 42B are installed in locations along the edges of bottom support 22 to indicate certifications and branding.

Figure 4:
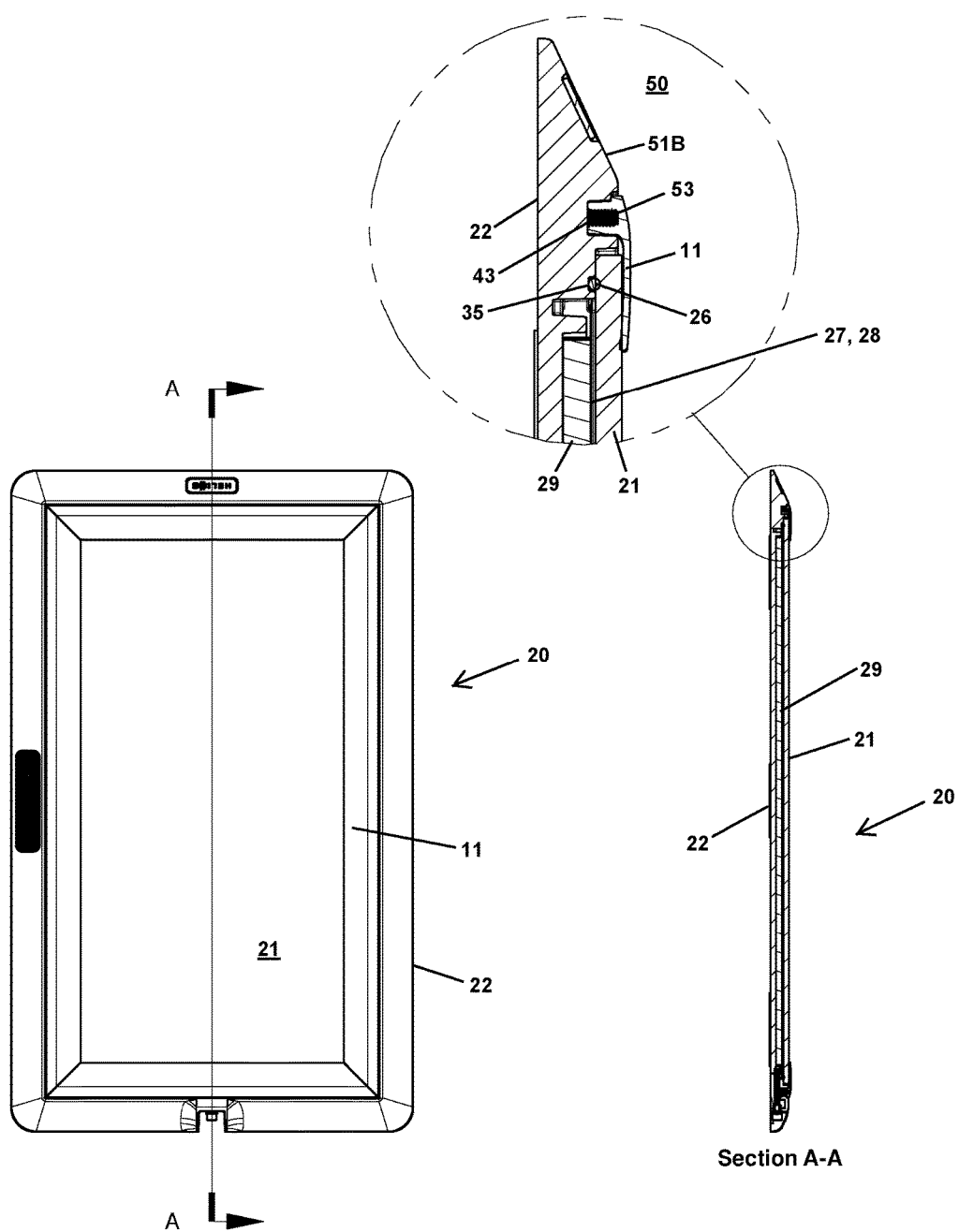
FIG. 4 is a detailed front view including a side cross section view of example lighting device 20 of FIG. 1.

Referring now to FIG. 4, a front view of example lighting device 20 is shown with a cross section A-A showing locations of front cover 21, light guide 29 and the back of bottom support 22. Callout 50 illustrates details of the locations of channel 35, rectangular seal 26, female threaded studs 53 provided in inset frame 11 and the manner in which inset frame 11 secures front cover 21 over the internal components of lighting device 20. FIG. 4 also illustrates the sloped/beveled edges 51B at the ends of bottom support 22. Due to the interlocking fit of inset frame 11 to bottom support 22, very few void volumes are present in lighting device, preventing movement of components that otherwise might be distorted or crushed under heavy loads in a design having room for components to move. Rectangular seal 26 is compressed when lighting device 20 is assembled, increasing resistance to liquid intrusion by enhancing the seal, rather than breaking the seal. Despite the compact design, lighting device is fully serviceable due to the lack of any adhesives in the design and inset frame 11 being assembled with removable fasteners, i.e., machine bolts 43.

Figure 5:
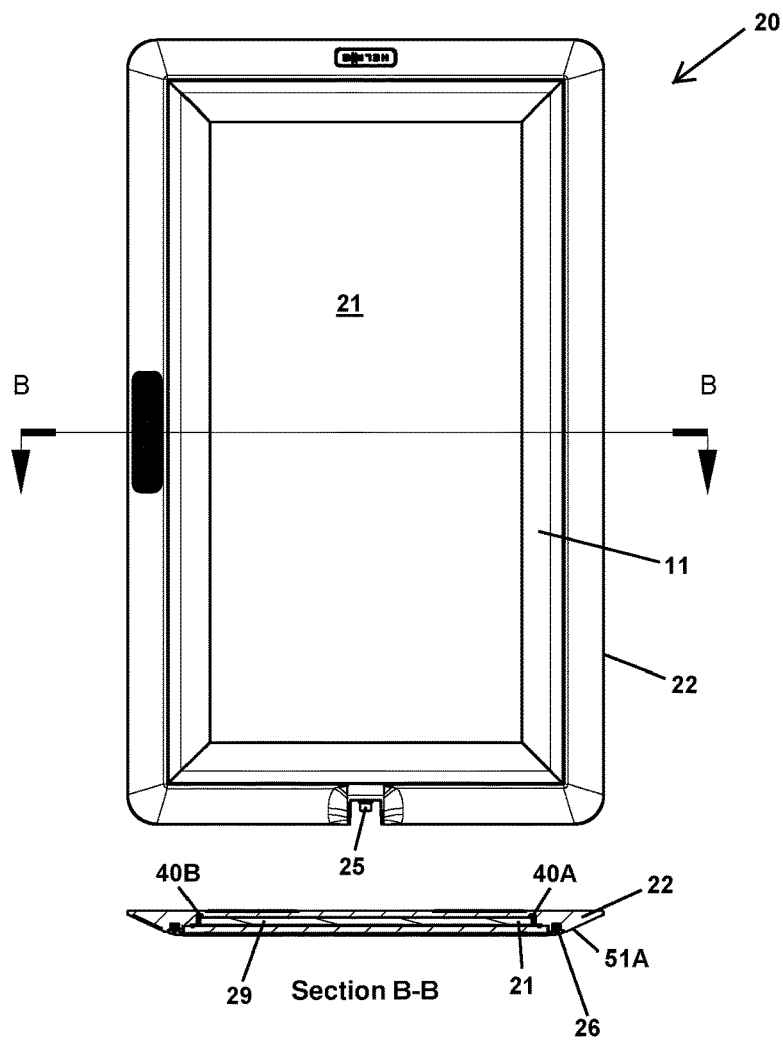
FIG. 5 is a detailed front view including an end cross section view of example lighting device 20 of FIG. 1.

Referring now to FIG. 5, another front view of example lighting device 20 is shown with a cross section B-B showing locations of front cover 21, light guide 29, LED strips 40A,40B, rectangular seal 26 and bottom support 22. FIG. 5 also illustrates the sloped/beveled edges 51A at the ends of bottom support 22.

Figure 6A:
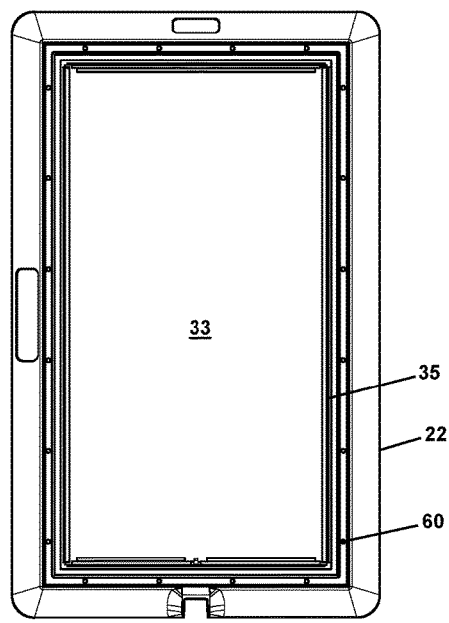
FIG. 6A is a front view.
Figure 6B:
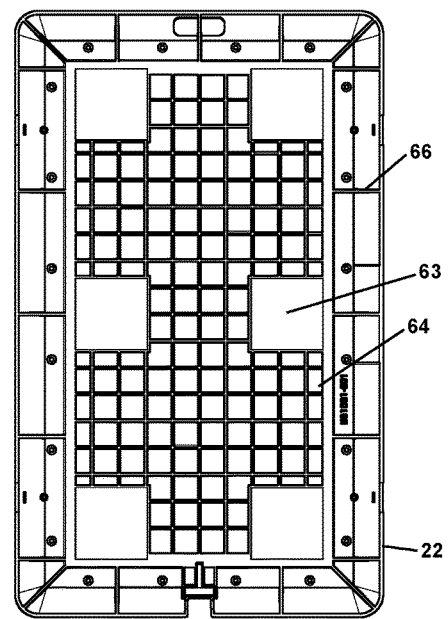
FIG. 6B is a rear view, respectively, of example lighting device 20 of FIG. 1.

Referring now to FIGS. 6A-6B, a front view FIG. 6A of bottom support 22 shows the locations of cavity 33, channel 35 for receiving rectangular seal 26 (not shown) and a channel 60 that receives a mating edge of inset frame 11 (not shown). Rear view FIG. 6B shows location of lands 63 for receiving anti-skid pads 23 (not shown), which may be secured with contact adhesive or other suitable attachment adhesive. The bottom plane of bottom support 22 shown in FIG. 6B includes a raised grid pattern 64, which provides for casting mold release, as well as preventing buildup of a film of dirt and fluid lubricants that might form on a flat surface. Grid pattern 64 and webbing 66 cast in the back of bottom support 22, which is made of a high strength-to-weith material such as A380 Aluminum, improve the load bearing capabilities of lighting device, which is designed to withstand a loading of 15 tons on the edges of bottom support 22, with a strength exceeding that across both edges. Anti-skid pad 23 land 63 locations are evenly distributed to distribute the load across a large contact area at the bottom of lighting device 20, for any approach direction of a wheel or other object and are of sufficient size to ensure that the load is not concentrated in small regions of bottom support 22.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A lighting device for under-vehicle use, comprising:
a planar light guide;
one or more light-emitting-diode (LED) lighting strips arranged on a periphery of the planar light guide;
a transparent or semi-transparent top cover sheet disposed above a top side of the planar light guide;
a unitary bottom support disposed beneath the planar light guide that includes a central cavity that supports and encloses the one or more LED lighting strips, the planar light guide and the top cover sheet and includes beveled edges extending from above the top cover sheet to a bottom face of the unitary bottom support on both sides and both ends of the lighting device, and wherein the beveled edges are curved at corners formed by the intersections thereof to provide a smooth beveled surface surrounding the lighting device; and
a flexible seal disposed between the top cover sheet and the unitary bottom support to provide a seal against intrusion of fluids and particulate, wherein the unitary bottom support has a channel extending around the perimeter of the unitary bottom support for receiving the flexible seal, wherein the flexible seal has an outline configured to fit in the channel, and wherein the flexible seal has a circular cross-section.

2. The lighting device of claim 1, further comprising one or more diffuser plates disposed between the top cover sheet and the planar light guide.

3. The lighting device of claim 2, wherein the one or more diffuser plates comprises:
a first diffuser plate disposed between the planar light guide and the top cover sheet for diffusing light received from the planar light guide to increase uniformity of the illumination emitted through the top cover sheet; and a second diffuser plate disposed between the planar light guide and the first diffuser plate for reducing glare caused by light emitted from the planar light guide extending in a direction greater than 45 degrees from a direction normal to and outward from the top cover sheet.

4. The lighting device of claim 3, further comprising a reflector plate disposed between the planar light guide and the unitary bottom support.

5. The lighting device of claim 1, further comprising a retaining frame attached to the unitary bottom support above the top cover sheet for retaining the top cover sheet and the planar light guide inside the unitary bottom support.

6. The lighting device of claim 1, further comprising a reflector plate disposed between the planar light guide and the unitary bottom support.

7. The lighting device of claim 1, further comprising a plurality of anti-skid pads attached to the bottom face of the unitary bottom support.

8. A lighting system for under-vehicle use, comprising:
a power supply having a first connector for receiving a mains power input cable and a second connector for supplying a dc output voltage;
a lighting device having a third connector for receiving the dc output voltage from the power supply; and
a cable for connecting the second connector of the power supply to the third connector of the lighting device, and wherein the lighting device comprises a rectangular planar light guide, one or more light-emitting-diode (LED) lighting strips arranged on opposite edges of the rectangular planar light guide, a transparent or semi-transparent top cover sheet disposed above a top side of the rectangular planar light guide, a unitary rectangular bottom support disposed beneath the rectangular planar light guide that includes a central cavity that supports and encloses the one or more LED lighting strips, the rectangular planar light guide and the top cover sheet and includes beveled edges extending from above the top cover sheet to a bottom face of the unitary rectangular bottom support on both sides and both ends of the lighting device, and wherein the beveled edges are curved at corners formed by the intersections thereof to provide a smooth beveled surface surrounding the lighting device, a rectangular retaining frame attached to the unitary rectangular bottom support above the top cover sheet for retaining the top cover sheet and the planar light guide inside the unitary rectangular bottom support, a reflector plate disposed between the rectangular planar light guide and the unitary rectangular bottom support, a first diffuser plate disposed between the planar light guide and the top cover sheet for diffusing light received from the rectangular planar light guide to increase uniformity of the illumination emitted through the top cover sheet, and a second diffuser plate disposed between the rectangular planar light guide and the first diffuser plate for reducing glare caused by light emitted from the rectangular planar light guide extending in a direction greater than 45 degrees from a direction normal to and outward from the top cover sheet.

9. A method of construction of a lighting device for under-vehicle use, the method comprising:
providing a unitary bottom support having beveled edges extending from above a central cavity formed within the unitary bottom support to a bottom face of the unitary bottom support on both sides and both ends of the lighting device, and wherein the beveled edges are curved at corners formed by the intersections thereof to provide a smooth beveled surface surrounding the lighting device;
inserting a planar light guide within the central cavity of the unitary bottom support;
inserting one or more light-emitting-diode (LED) lighting strips on opposite edges of the planar light guide;
adding a transparent or semi-transparent top cover sheet above a top side of the planar light guide;
installing a seal between the top cover sheet and the unitary bottom support to provide a seal against intrusion of fluids and particulate, wherein the unitary bottom support has a channel extending around the perimeter of the unitary bottom support for receiving the seal, wherein the seal is a flexible seal having an outline configured to fit in the channel and having a circular cross-section; and
attaching a retaining frame to the unitary bottom support above the top cover sheet to retain the top cover sheet and the planar light guide inside the unitary bottom support.

10. The method of claim 9, further comprising installing one or more diffuser plates between the top cover sheet and the planar light guide.

11. The method of claim 10, wherein the installing one or more diffuser plates comprises:
installing a first diffuser plate disposed between the planar light guide and the top cover sheet for diffusing light received from the planar light guide to increase uniformity of the illumination emitted through the top cover sheet; and
installing a second diffuser plate disposed between the planar light guide and the first diffuser plate for reducing glare caused by planar light emitted from the planar light guide extending in a direction greater than 45 degrees from a direction normal to and outward from the top cover sheet.

12. The method of claim 11, further comprising installing a reflector plate between the planar light guide and the unitary bottom support.

13. The method of claim 9, further comprising installing a reflector plate between the planar light guide and the unitary bottom support.

14. The method of claim 9, further comprising attaching a plurality of anti-skid pads to the bottom face of the unitary rectangular bottom support.

15. A lighting device for under-vehicle use, comprising:
a planar light guide;
one or more light-emitting-diode (LED) lighting strips arranged on a periphery of the planar light guide;
a transparent or semi-transparent top cover sheet disposed above a top side of the planar light guide;
a unitary bottom support disposed beneath the planar light guide that includes a central cavity that supports and encloses the one or more LED lighting strips, the planar light guide and the top cover sheet and includes beveled edges extending from above the top cover sheet to a bottom face of the unitary bottom support on both sides and both ends of the lighting device, and wherein the beveled edges are curved at corners formed by the intersections thereof to provide a smooth beveled surface surrounding the lighting device;
a first diffuser plate disposed between the planar light guide and the top cover sheet for diffusing light received from the planar light guide to increase uniformity of the illumination emitted through the top cover sheet; and a second diffuser plate disposed between the planar light guide and the first diffuser plate for reducing glare caused by light emitted from the planar light guide extending in a direction greater than 45 degrees from a direction normal to and outward from the top cover sheet.

16. The lighting device of claim 15, further comprising a reflector plate disposed between the planar light guide and the unitary bottom support.

17. A method of construction of a lighting device for under-vehicle use, the method comprising:

providing a unitary bottom support having beveled edges extending from above a central cavity formed within the unitary bottom support to a bottom face of the unitary bottom support on both sides and both ends of the lighting device, and wherein the beveled edges are curved at corners formed by the intersections thereof to provide a smooth beveled surface surrounding the lighting device;

inserting a planar light guide within the central cavity of the unitary bottom support;

inserting one or more light-emitting-diode (LED) lighting strips on opposite edges of the planar light guide;

adding a transparent or semi-transparent top cover sheet above a top side of the planar light guide;

installing a first diffuser plate disposed between the planar light guide and the top cover sheet for diffusing light received from the planar light guide to increase uniformity of the illumination emitted through the top cover sheet;

installing a second diffuser plate disposed between the planar light guide and the first diffuser plate for reducing glare caused by planar light emitted from the planar light guide extending in a direction greater than 45 degrees from a direction normal to and outward from the top cover sheet; and attaching a retaining frame to the unitary bottom support above the top cover sheet to retain the top cover sheet and the planar light guide inside the unitary bottom support.

18. The method of claim 17, further comprising installing a reflector plate between the planar light guide and the unitary bottom support.

* * * * *